United States Patent [19]

Sakamoto

[11] Patent Number: 5,176,425
[45] Date of Patent: Jan. 5, 1993

[54] SEAT FRAME FOR VEHICLE

[75] Inventor: Daishiro Sakamoto, Ayase, Japan

[73] Assignee: Ikeda Bussan Company, Ltd., Kanagawa, Japan

[21] Appl. No.: 726,154

[22] Filed: Jul. 1, 1991

Related U.S. Application Data

[63] Continuation of Ser. No. 660,245, Feb. 22, 1991, abandoned, which is a continuation of Ser. No. 366,772, Jun. 15, 1989, abandoned.

[30] Foreign Application Priority Data

Sep. 16, 1988 [JP] Japan .................. 63-121468[U]

[51] Int. Cl.⁵ .................................. A47C 7/35
[52] U.S. Cl. ............................. 297/452; 297/458
[58] Field of Search .................. 297/452, 454–458, 297/440

[56] References Cited

U.S. PATENT DOCUMENTS

| | | | |
|---|---|---|---|
| 1,329,068 | 1/1920 | Young | 297/452 |
| 3,060,287 | 1/1975 | Platt | 297/452 |
| 3,880,467 | 4/1975 | Tischler | 297/452 |
| 4,231,615 | 11/1980 | Griffiths | 297/452 |
| 4,583,782 | 4/1986 | Mikuniya | 297/452 X |
| 4,740,035 | 4/1988 | Kazaoka et al. | 297/452 |
| 4,842,257 | 6/1989 | Abu-Isa et al. | 297/452 X |

FOREIGN PATENT DOCUMENTS 98937 7/1961 Netherlands .................. 297/452

Primary Examiner—Jose V. Chen
Attorney, Agent, or Firm—Gifford, Groh, Sprinkle, Patmore & Anderson

[57] ABSTRACT

A seat frame for vehicles, constructed of wire elements, one of the wire elements having an end portion extending toward an outer periphery of the seat frame, an end portion of another wire element located in the vicinity of the end portion of the one wire element extending outwardly, and a leading end of such end portion bent to lie in proximity to and outside a leading end of the end portion of the one wire element and serving as a protecting portion which forms a part of the outer periphery of the frame.

4 Claims, 2 Drawing Sheets

SEAT FRAME FOR VEHICLE

This is a continuation of copending application Ser. No. 07/660,245, filed on Feb. 22, 1991, now abandoned, which is a continuation of copending application Ser. No. 07/366,772, filed on Jun. 15, 1989, now abandoned.

BACKGROUND OF THE INVENTION

1. Field of the Invention

The present invention relates to a seat frame for vehicles, which is constructed of wire elements.

2. Description of the Prior Art

Conventional seat frames for vehicles are constructed in such a manner that the outer frame member is formed in a protective bend to provide protection for the protruding outer end of an inner wire member to prevent damage to the pad of the seat. This unduly increases cost of providing the frames since a number of wire ending steps are required.

SUMMARY OF THE INVENTION

The present invention overcomes the problems associated with the prior art. It is an object of the present invention to provide a seat frame for vehicles in which the pad member cannot be damaged and which may be manufactured in a minimum number of steps.

To attain the above object, the present invention provides a seat frame for vehicles, which is constructed of wire elements, one of the wire elements having an end portion extending toward an outer periphery of the seat frame, wherein an end portion of another wire element located in the vicinity of the end portion of the one wire element is extended outwardly, and a leading end of such end portion is folded to lie in proximity to and outside a leading end of the end portion of the one wire element and to serve as a protecting portion which forms a part of the outer periphery of the frame.

With this construction, the protecting portion, which is the leading end of the end portion of the other wire elements, is located in proximity to that end portion of the one wire element extending toward the outer periphery of the seat frame and forms a part of the outer periphery of the seat frame. The pad member covering the seat frame is in contact with the seat frame in a condition near to a line contact in the vicinity of the leading end of the one wire element.

Accordingly, the pad member cannot be damaged, for example, due to piercing of the pad member by the leading end of the one wire element.

Further, even if a portion of the wire element to be joined to the end portion of the one wire element is not formed into a U-shape so that the pad member cannot be damaged by the leading end of the wire element, it is possible to join the end portion of the one wire element to such portion to be joined, and thus to protect the end portion of the other wire element by the protecting portion provided by the leading end of the end portion of the one wire element. This ensures that the pad member cannot be damaged, and this also provides advantages such as a facilitated shaping, shortened wire elements, a decrease in cost of manufacture, and a reduction in weight of the seat frame.

The above and other objects, features and advantages of the invention will become apparent from a reading of the following description of the preferred embodiment, taken in conjunction with the accompanying drawings.

BRIEF DESCRIPTION OF THE DRAWINGS

FIGS. 1 and 2 illustrate one embodiment of the present invention, wherein:

FIG. 1 is a top view of an essential portion of a rear seat for vehicles; and

FIG. 2 is a view taken along a line 2—2 in FIG. 1; and

DESCRIPTION OF THE PREFERRED EMBODIMENT

The present invention will now be described by way of one embodiment with reference to the accompanying drawings.

Figure 3:
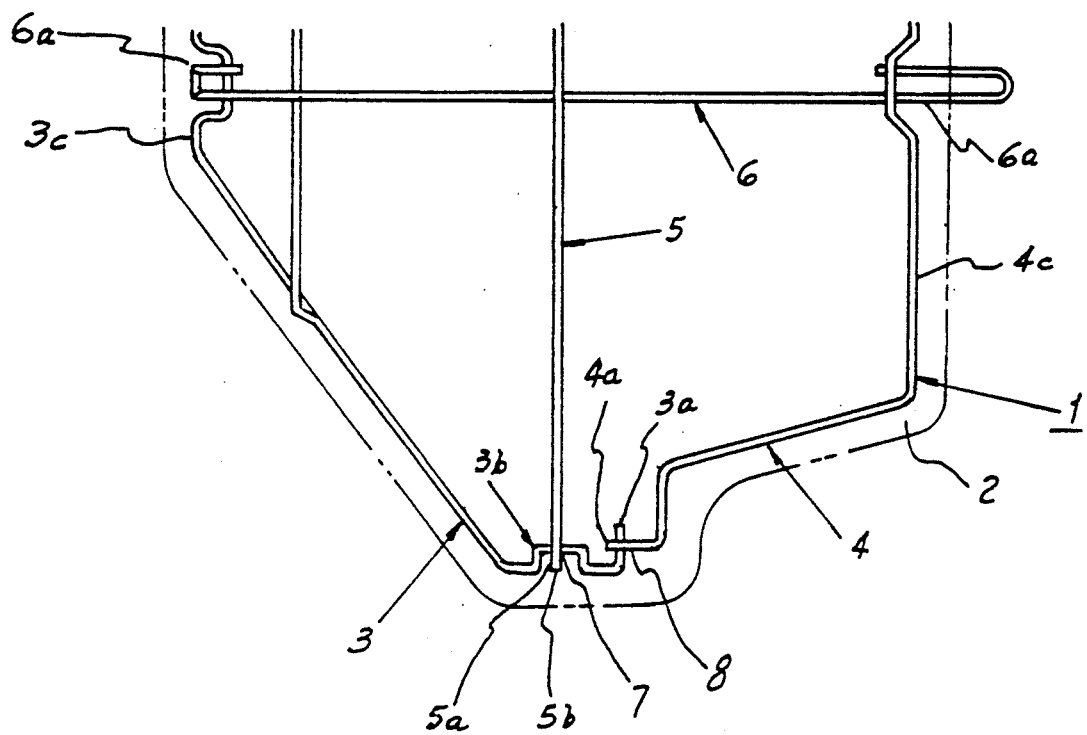
FIG. 3 is a top view of an essential portion of a rear seat for vehicles according to the prior art.

FIG. 3 illustrates a seat frame for a vehicle of conventional construction.

As shown in FIG. 3, a rear seat frame 1 for vehicles is constructed of a plurality of wire elements and covered with a pad member 2.

An outer frame wire element 3 forming a front, outer frame portion of the seat frame 1 has a portion 7 joined to an inner wire element 5 for reinforcing the seat frame 1, which portion 7 is formed into a U-shape which protrudes inwardly of the seat frame 1. An end 3a of the outer frame wire element 3 is bent at approximately 90 degrees inwardly with respect to an abutting joined portion 8.

An outer wire element 4 forming a rear, outer frame portion of the seat frame 1 is also bent at its end 4a at approximately 90 degrees with respect to outer frame wire element end 3A.

In joining the end of a wire element to another wire element, it is necessary to join the end of the wire element to the other wire element such that it protrudes slightly from a portion of the other wire element to be joined, from the standpoint of strength, assembling workability and the like.

Therefore, the end portion 3a of the front, outer frame wire element 3 is joined to the end portion 4a of the rear, outer frame wire 4 so as to protrude inwardly of the seat frame 1 with respect to the joined portion 8 of the front and rear, outer frame wires 3 and 4.

A front portion 3c of the front, outer frame wire element 3 and a rear portion 4c of the rear, outer frame wire element 4 are joined to opposite ends 6a of an inner wire element 6 for reinforcing the outer frame wire elements 3 and 4, respectively.

The other inner wire element 5 is joined to the inner wire 6 and is further joined at an end portion 5a thereof to a U-shaped portion 3b of the front, outer frame wire element 3 without projection from the outermost portion of the U-shaped portion 3b, so that a leading end 5b of the end portion 5a will not damage the pad member 2.

In such conventional seat frames 1 for vehicles, however, the following problem is encountered in joining the outer frame wire element 3 with the inner wire element 5: The U-shaped portion 3b must be provided on the outer frame wire element 3 in order that the pad member 2 not be damaged, resulting in an increased number of wire bending steps thereby increasing the cost of production.

Figure 1:
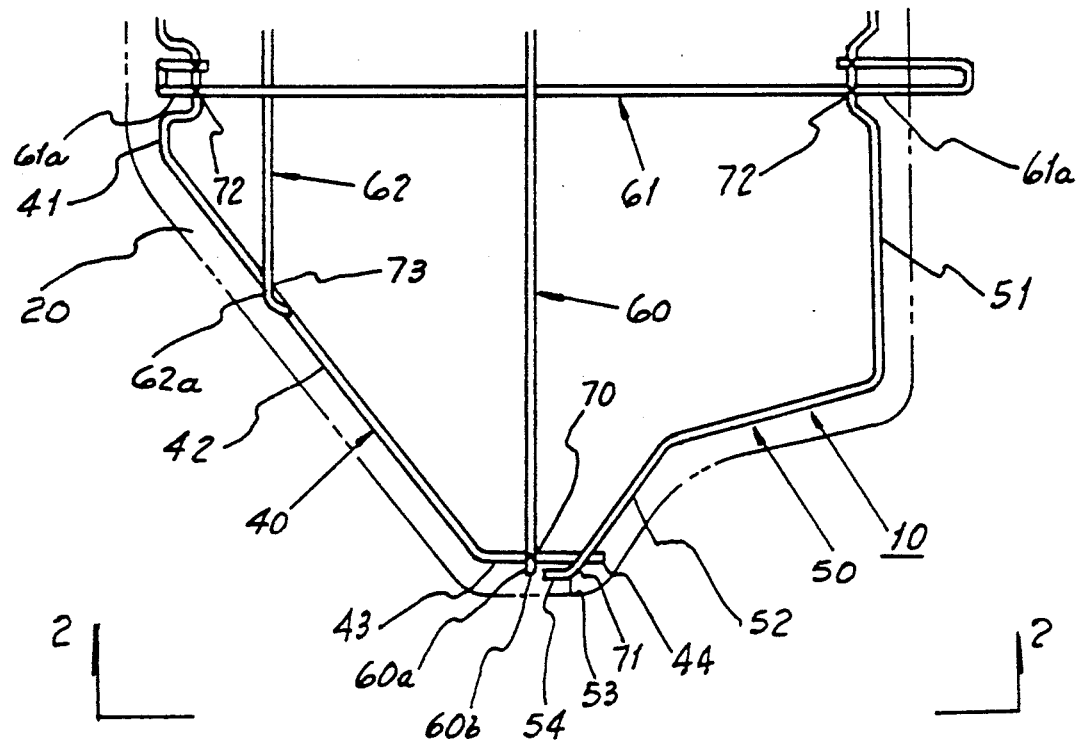
Figure 2:
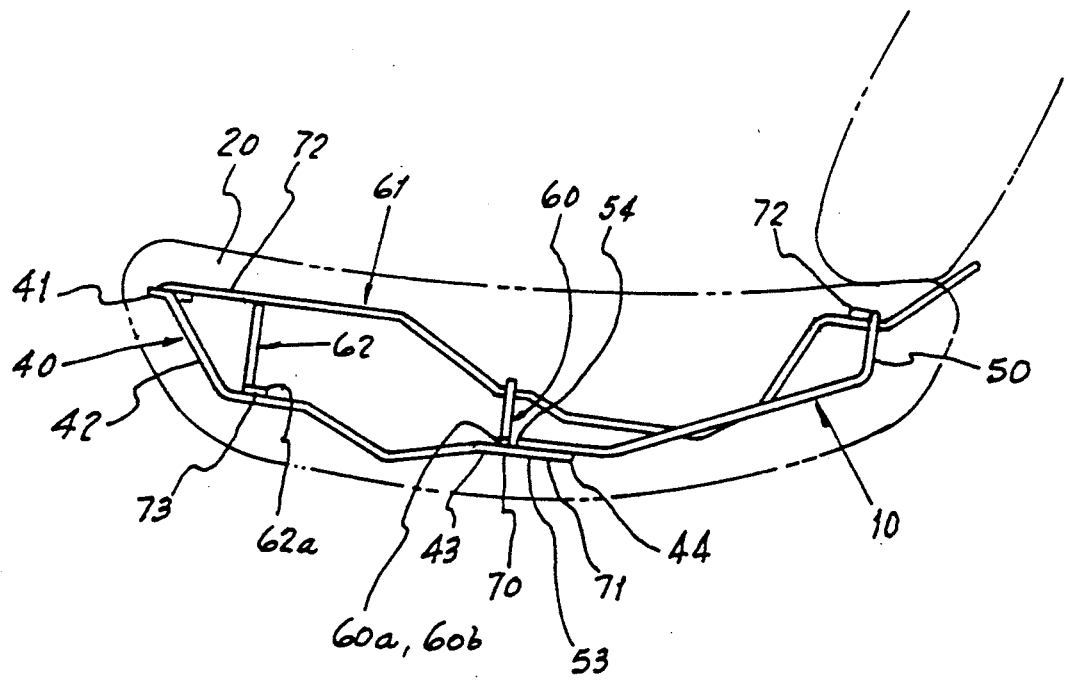

FIGS. 1 and 2 illustrate one embodiment of the present invention.

A seat cushion for a rear seat for a vehicle, is comprised of a seat frame 10 which is long sideways for laterally double seating and made of a plurality of wire elements joined to one another, and a pad member 20 covering the seat frame 10 in close contact therewith. FIG. 1 illustrates the lefthand half of the seat cushion.

An outer frame wire element 40 which is a front, outer frame portion of the seat frame 10 which is formed with a front portion 41 which is a front face of the seat frame 10, a rearwardly extending portion 42 bent slightly rearwardly from the front portion 41, and a side portion 43.

An outer frame wire element 50 which is a rear, outer frame portion of the seat frame 10 which is formed with a rear portion 51 and a side portion 52 which is a part corresponding to a wheel house for a rear wheel.

An inner wire element for reinforcing the outer frame wire elements 40 and 50 has ends 61a joined to the front portion 41 of the front, outer frame wire element 40 and a rear portion 51 of the rear, outer frame wire element 50, respectively.

As shown in FIG. 1, first and third inner wire elements 60 and 62 are joined to a second inner wire element 61 so as to intersect it at approximately 90 degrees, and are also joined at their ends 60a and 62a to the side portion 43 and rearwardly extending portion 42 respectively of the outer frame wire 40. The outer frame wire element 40 terminates at a rear end 44.

The end portions 60a, 61a and 62a of the inner wires 60, 61 and 62 are joined to the outer frame wire elements 40 and 50 protrude from joined portions 70, 72 and 73 with the outer wire elements 40 and 50 to provide strength, ease of assembly and the like.

An end portion 53 of the rear, outer wire element 50 is joined at first connection 71 to the front, outer frame wire element 40 in the vicinity of the joined portion or second connection 70 of the front, outer frame wire element 40 with the inner wire element 60, and is bent in a parallel direction to the side portion 43 of the front, outer frame wire element 40 at a place slightly displaced outwardly from a leading end 60b of the inner wire element 60 so as to lie in proximity to the leading end 60b of the inner wire element 60.

The leading end of the rear, outer frame wire element 50 located in proximity to the leading end 60b of the inner wire element 60 serves as a protecting portion 54, and a section from the side portion 52 of the rear, outer wire element 50 via the protecting portion 54 and the leading end 60b of the inner wire element 60 to the side portion 43 of the front, outer frame wire element 40 forms a part of an outer periphery of the seat frame 10.

Since the protecting portion 54 of the rear, outer frame wire element 50 is in proximity to the leading end 60b of the inner wire element 60 and forms a part of the outer periphery of the seat frame 10 in cooperation with the leading end 60b of the inner wire element 60, the pad member 20 is protected by being in contact with the leading end 60b of the inner wire element 60 and also in contact with the protecting portion 54 in a condition near to a line contact.

Thus, even if a person deforms the pad member 20, the pad member 20 is protected and cannot be damaged due to piercing of the pad member 20 by the leading end 60b of the inner wire element 60.

In addition, the inner wire element 60 can be joined to the outer frame wire 40 even if the portion 70 of the outer frame wire element 40 to be joined with the inner wire element is not formed into U-shape.

While I have described several embodiments of the present invention it should be apparent that other modifications can be made to the preferred embodiments without departing from the spirit of the invention as defined by the scope of the appended claims.

What is claimed is:

1. A seat frame for vehicles for protecting a pad member, said seat frame comprising:
   a front outer frame wire and a rear outer frame wire, said front outer frame wire having a side portion and said rear outer frame wire having a protecting portion substantially parallel to said side portion of said front outer frame wire;
   at least one inner wire;
   a first connection between said front outer frame wire and said rear outer frame wire;
   a second connection between said front outer frame wire and said at least one inner wire;
   a leading end of said at least one inner wire, said leading end extending outward of said front outer frame wire;
   said protecting end of said rear outer frame wire projecting beyond said first connection in a direction parallel to said side end, said protecting end terminating at a point slightly outwardly of said leading end, said protecting end positioned in proximity to said leading end, said protecting end further forming a part of the outer periphery of said seat frame in cooperation with said leading end; and
   wherein said protecting end prevents said pad from being pierced by said leading end of said at least one inner wire.

2. The invention as described in claim 1, wherein said at least one inner wire includes a first inner wire extending crosswise from a second inner wire, said second inner wire being connected at opposing ends by inner wire ends.

3. The invention as described in claim 2, further including a third inner wire being connected to a rearwardly extending end of said front outer frame wire at one end thereof.

4. A seat frame for vehicles for protecting a pad member, said seat frame comprising:
   a front outer frame wire having a side portion;
   a rear outer frame wire having a protecting portion, said rear outer frame wire joined to said side portion of said front outer frame wire, said protecting portion being disposed parallel to said side portion and spaced outwardly a predetermined distance therefrom; and
   at least one inner wire having a leading end joined to said side portion of said front outer frame wire, said leading end extending beyond said side portion and terminating at a location intermediate said side portion and said protection portion;
   wherein said protecting portion prevents said pad from being pierced by said leading end of said at least one inner wire.

* * * * *